US008801812B2

(12) United States Patent
Kiyama

(10) Patent No.: US 8,801,812 B2
(45) Date of Patent: Aug. 12, 2014

(54) SOLID FUEL

(75) Inventor: Michihiro Kiyama, Hiroshima (JP)

(73) Assignee: Creative Co., Ltd., Hiroshima (JP)

( * ) Notice: Subject to any disclaimer, the term of this patent is extended or adjusted under 35 U.S.C. 154(b) by 131 days.

(21) Appl. No.: 13/521,774

(22) PCT Filed: Oct. 20, 2010

(86) PCT No.: PCT/JP2010/068494
§ 371 (c)(1),
(2), (4) Date: Sep. 20, 2012

(87) PCT Pub. No.: WO2011/086741
PCT Pub. Date: Jul. 21, 2011

(65) Prior Publication Data
US 2013/0008358 A1 Jan. 10, 2013

(30) Foreign Application Priority Data
Jan. 18, 2010 (JP) ................................. 2010-008343

(51) Int. Cl.
*C10L 5/44* (2006.01)
*B30B 15/34* (2006.01)

(52) U.S. Cl.
USPC ................... 44/589; 44/605; 44/636; 44/596; 44/597

(58) Field of Classification Search
USPC .................... 44/550, 593, 596, 597, 605, 636
See application file for complete search history.

(56) References Cited

U.S. PATENT DOCUMENTS

| 6,298,651 | B1 | 10/2001 | Iijima |
| 2004/0045215 | A1 | 3/2004 | Guilfoyle |
| 2009/0235578 | A1 | 9/2009 | Nopper |

FOREIGN PATENT DOCUMENTS

| CZ | 296046 B6 * | 12/2005 |
| CZ | 296279 B6 * | 2/2006 |
| DE | 19955844 | 5/2000 |
| DE | 202006011668 U1 * | 11/2006 |
| EP | 1471132 A2 * | 10/2004 |
| JP | 47-26162 | 7/1972 |
| JP | 59-217796 | 12/1984 |
| JP | 11-35950 | 2/1999 |
| JP | 2008-215710 | 9/2008 |
| JP | 3152108 | 7/2009 |
| WO | 2008/014838 A1 | 2/2008 |
| WO | 2009/006661 A1 | 1/2009 |

OTHER PUBLICATIONS

"Screw Pressing of Jatropha Seeds for Fueling Purposes in Less Developed Countries" (Aug. 2007).*
"Fact Foundation Jatropha Handbook First Draft" (Mar. 2006).*
E.P.O. Office Action in EP 10843096.8, mail date is Jan. 23, 2014.
China Office action, dated Jul. 26, 2013, issued in Chinese Application 201080061794.2 along with an english translation thereof.
Extended European Search Report issued with respect to European Application No. 10843096.8, dated May 24, 2013.
Karaosmanaglu, "Biobriquetting of Rapeseed Cake", *Energy Sources*, vol. 22, No. 3, Jan. 2000, pp. 261-263, tables 3-6.
Meng Ye et al., "Current situation and prospects of *Jatropha curcas* as a multipurpose tree in China", *Agroforestry Systems*, vol. 76, No. 2, 5, Apr. 2009, pp. 494, comumn 2, line 21-27.
U.S. Appl. No. 13/522,366 to Michihiro Kiyama, filed Jul. 16, 2012.
Search report from International Application No. PCT/JP2010/068494, mail date is Dec. 21, 2010.

* cited by examiner

*Primary Examiner* — Pamela H Weiss
(74) *Attorney, Agent, or Firm* — Greenblum & Bernstein, P.L.

(57) ABSTRACT

[Problem] To provide a solid fuel suitable for thermal power generation by making use of the fruit seed or press cake thereof of a plant which grows in large quantities in nature.
[Solution] The solid fuel comprises a composition containing 70 wt % or more, on dry basis, of the fruit seed or press cake thereof of *Ricinus communis, Triadica sebifera, Jatropha curcas, Brassica rapa* L. var. *nippo-oleifera, Plamae, Zea mays* or *Prosopis glandulosa* (honey mesquito) and is hot compression molded.

9 Claims, No Drawings

SOLID FUEL

FIELD OF THE INVENTION

The present invention relates to a solid fuel. More specifically, it relates to a solid fuel which makes effective use of the fruit (especially seed) of a certain kind of a plant which grows in large quantities in nature and contains a lot of an oil component, or press cake obtained after the extraction of an oil component from the seed thereof. Much more specifically, it relates to a solid fuel which makes effective use of the above fruit (especially seed) or press cake thereof, produces as small an amount as possible of a harmful gas or residue after combustion, generates a large quantity of heat and leads to the suppression of the production of carbonic dioxide, especially a solid fuel suitable for use as a fuel for thermal power generation.

DESCRIPTION OF THE PRIOR ART

The causes of global warming which is one of the global environmental issues include an increasing amount of carbon dioxide existent in air. Various approaches to the suppression of the production of carbon dioxide are being made on a global basis. As one of the approaches, the production of biofuels and use of them in automobiles and power boilers as alternatives to fossil fuels such as coal and gasoline are under way. However, use of foods such as corn which are used as raw materials of the biofuels is breaking down ecological balance and economical balance and therefore it cannot be said that this is the best approach. Thus, it is necessary to take global environment into consideration while effects on clothing, food and housing whose balance is indispensable for human lives are minimized. Since this is a very difficult problem to be solved, various studies are under way but the problem is not solved yet. Then, a solid fuel making use of plastics is used in power boilers as an alternative to oil and coal but it cannot be said that its effect of suppressing the production of carbon dioxide is satisfactory.

Fruits (especially seeds) having a relatively high content of an oil component exist in nature though they are not edible. There are a large number of known fruits (seeds) from which an oil component is extracted to be used in soap and industrial products. Out of these, the following have a large number of seeds from which an oil component is extracted to be used for many purposes.

(1) *Ricinus communis*

It is also known as "castor-oil plant" and a perennial which grows in large quantities in Africa, India and China. Although oil extracted from its seed is used as a raw material of castor oil, the oil has high toxicity and is not so much used as food.

However, studies on the oil component for use as a bio fuel or an alternative fuel to crude oil are now under way.

(2) *Triadica sebifera*

It is also known as "*Sapium sebiferum*" or "Chinese tallow tree" and grows in large quantities in China and Taiwan. An oil component extracted from its seed is used as a raw material of soap or candles and partially used for medical purpose.

(3) *Jatropha curcas*

It is also known as "physic nut" or "*Jatropha*", its seed has a high content of oil though it grows in Central and South America, and its crop yields are very high. Therefore, it is cultivated in large quantities in many countries such as India, China, Africa and South America. Oil extracted from its seed is used in soap and candles and is now attracting lots of attention as a biodiesel fuel.

(4) *Brassica rapa* L. var. *nippo-oleifera*

It is also known as "oilseed rape" and a cruciferous biennial plant that belongs to the family *Brassica*. It is a crop plant which has been cultivated as a vegetable to extract oil and otherwise known as "field mustard" or "colza (cole seed, a collected seed in a precise sense) and was called "Kona" or "Nasumire" in the Edo period.

(5) Palmae

It is a generic term for palm plants. It is divided into 11 subfamilies such as *Cocos nucifera* L., *Areca* and *Calamus margaritas* and 29 genera (tribes).

It grows in large quantities in the tropical region. The flesh (mesocarp) having a high sugar content of date palm has been used as food for 6000 years in Middle and Near East and is now used in sweet stuff, fructose and alcohols. A large amount of high-quality oil (copra) is obtained from the albumen of *Cocos nucifera* L. or *Elaeis guineensis* Jacq. and used in industrial soap and margarine. Syrup and sugar are obtained by cutting the peduncles of several kinds of *Arenga pinnata*, boiling down sap bled from the cut ends and drying it.

(6) *Zea mays*

It is a gramineous annual plant. Its seed as grain is used as human diet and livestock feed and is also important as a raw material of starch (corn starch), oil or bioethanol, and its annual world production amounts to 600,000,000 tons. About 400,000,000 tons out of it is used as feed and about 200,000,000 tons is used as a staple of the human diet.

(7) Honey Mesquito (*Prosopis glandulosa*)

It is distributed in the southwest of America from Texas to California and the north of Mexico. It grows on dry plains, hills and deserts, and its height becomes about 6 m. Its raceme droops and its aromatic light yellow flowers bloom from spring to summer. Its fruit is a shell and ripens in summer. Indians living in the southwest eat this shell.

SUMMARY OF THE INVENTION

Problem to Be Solved by the Invention

Then, the inventors of the present invention paid attention to the fact that the above seed or cake (to be simply referred to as "press cake" hereinafter) obtained after an oil component has been extracted from the seed is produced in large quantities and conducted intensive studies to develop a solid fuel which makes effective use of the seed or the cake and can be used as a new energy source for suppressing the production of carbon dioxide in particular. As far as the inventors know, especially the press cake is produced in almost the same amount as that of the extracted oil component and a small amount of the oil component remains in the press cake. Therefore, it is generally known that the press cake itself is in the form of seed pieces and can be used as fuel but its use is small in scale.

The inventors conducted studies to attain the above object and found that when the above seed, especially the press cake thereof or a composition comprising the same as the main component is thermally compressed and molded under specific conditions, a hard molded product can be obtained without using a large amount of a binder (for example, a plastic) or a form retaining agent (for example, a rubber or adhesive) intentionally and that the obtained molded product has a sufficiently large calorific value as a solid fuel. Further, they found that, surprisingly, the molded product has sufficiently high hardness and toughness, that is, excellent form retention stability though it contains the press cake as the main component. This form retention stability is one of extremely valuable characteristic properties as a solid fuel, especially a fuel for thermal power generation. A solid fuel goes through repetitions of steps such as storage, transportation and unloading after production (molding) before use. During these steps, fragmentation occurs and when fragmentation becomes marked, this product becomes unsuitable for use as an industrial solid fuel.

It was found that the fragmentation and disintegration of the solid fuel according to the present invention hardly occur in these steps after molding before use by users, whereby the solid fuel can retain its form for a long time as an industrial fuel having a suitable molded size, especially a fuel for thermal power generation.

Means for Solving the Problem

The present invention was made based on the above knowledge. According to the present invention, there is provided a solid fuel which comprises a composition containing 70 wt % or more, on dry basis, of a fruit seed or press cake thereof of *Ricinus communis, Triadica sebifera, Jatropha curcas, Brassica rapa* L. var. *nippo-oleifera*, Plamae, *Zea mays* or honey mesquito and is hot compression molded.

According to a preferred aspect of the present invention, there is provided the following solid fuel.

(1) The solid fuel wherein the composition contains 80 wt % or more, on dry basis, of the above fruit seed or press cake thereof.
(2) The solid fuel wherein the composition contains 85 wt % or more, on dry basis, of the above fruit seed or press cake thereof.
(3) The solid fuel which is obtained by compression molding the composition at a temperature of 80 to 150° C.
(4) The solid fuel wherein the composition contains 80 wt % or more, on dry basis, of the press cake of the fruit seed of *Ricinus communis*.
(5) The solid fuel wherein the composition contains 80 wt % or more, on dry basis, of the press cake of the fruit seed of *Triadica sebifera*.
(6) The solid fuel wherein the composition contains 80 wt % or more, on dry basis, of the press cake of the fruit seed of *Jatropha curcas*.
(7) The solid fuel wherein the composition contains 80 wt % or more, on dry basis, of the press cake of the fruit seed of *Brassica rapa* L. var. *nippo-oleifera*.
(8) The solid fuel wherein the composition contains 80 wt % or more, on dry basis, of the press cake of the fruit seed of Plamae.
(9) The solid fuel wherein the composition contains 80 wt % or more, on dry basis, of the press cake of the fruit seed of *Zea mays*.
(10) The solid fuel wherein the composition contains 80 wt % or more, on dry basis, of the press cake of the fruit of honey mesquito.
(11) The solid fuel having a calorific value of 15 to 30 Mj/kg.
(12) The solid fuel having an average size of 15 to 3,500 cm$^3$.
(13) The solid fuel having an apparent specific gravity of 0.3 to 0.6 g/cm$^3$.
(14) The solid fuel having a fragmentation ratio of 5 wt % or less in a form retention stability test.
(15) The solid fuel which is used for power generation.
(16) Use of the above solid fuel as a fuel for power generation.

Effect of the Invention

According to the present invention, there can be provided a solid fuel molded product having excellent form retention stability by making use of the fruit or press cake thereof of a certain kind of a plant which grows in large quantities in nature and part of which is used as food or oil. Particularly, there can be provided a solid fuel molded product as a solid fuel substantially composed of the press cake of a plant fruit, especially a solid fuel for power generation. Therefore, the solid fuel of the present invention is substantially formed from a plant in nature, does not produce a harmful gas and leads to the suppression of carbon dioxide.

DETAILED DESCRIPTION OF THE PREFERRED EMBODIMENT

The solid fuel of the present invention is obtained from the fruit seed or press cake thereof of *Ricinus communis, Triadica sebifera, Jatropha curcas, Brassica rapa* L. var. *nippo-oleifera*, Plamae, *Zea mays* or honey mesquito and formed from a composition substantially composed of the fruit seed or press cake thereof. As described above, some of the seeds of the fruits of the above plants are used as raw materials of food and oil. Therefore, the solid fuel of the present invention is preferably obtained from press cake of the above fruit seed. The press cake of the seed is a residue left after a dried seed is compressed to remove an oil component therefrom. Although the press cake contains small amounts of oil and water, it can be directly used as a raw material in the present invention.

The solid fuel of the present invention contains 70 wt % or more, preferably 80 wt % or more, particularly preferably 85 wt % or more, on dry basis, of the seed or press cake thereof. The dry weight means weight obtained by subtracting the amount of water contained in the seed or press cake thereof.

Since the above fruit seed or press cake thereof contains oil in no small amount, a solid fuel having excellent form retention stability and a sufficiently large calorific value can be obtained by compressing and molding the fruit seed or press cake thereof without adding a binder.

The solid fuel of the present invention comprises a composition which should contain 70 wt % or more, preferably 80 wt % or more, on dry basis, of the above seed or press cake thereof, preferably press cake thereof, or may contain substantially 100 wt % of the press cake. However, the composition may contain another component derived from a natural product, such as rubber or starch, in an amount of less than 30 wt %, preferably less than 20 wt %, particularly preferably less than 15 wt %.

Out of the above fruits, the fruit of *Ricinus communis, Triadica sebifera, Jatropha curcas, Brassica rapa* L. var. *nippo-oleifera* or Plamae is preferred, and the fruit of *Ricinus communis, Jatropha curcas* or Plamae is particularly preferred.

To mold the solid fuel of the present invention, the above composition is compression molded at a temperature of 80 to 150° C., preferably 100 to 130° C. For thermal compression, a single-screw or double-screw hot extruder may be used.

It is particularly desirable to use a double-screw extruder. The composition compression extruded by the extruder is discharged from a circular nozzle and cut to a suitable length so as to obtain a cylindrical molded product.

At this point, a solid fuel having a desired size can be obtained by setting the diameter of the circular nozzle to 25 to 50 mm, preferably 30 to 40 mm and the cut length to 20 to 70 mm, preferably 25 to 65 mm.

Since the solid fuel of the present invention is preferably manufactured by the above molding method from the industrial point of view, its shape is preferably cylindrical or prismatic, particularly preferably cylindrical. As for the size of the solid fuel, its average volume is 15 to 3,500 cm$^3$, preferably 20 to 1,000 cm$^3$.

The apparent specific gravity of the solid fuel is 0.3 to 0.6 g/cm$^3$, preferably 0.4 to 0.5 g/cm$^3$.

The solid fuel has a stable calorific value of 15 to 30 MJ/kg, preferably 20 to 28 MJ/kg. Therefore, the solid fuel of the present invention has a highly stable calorific value and excellent form retention stability and is therefore advantageously used as a fuel for thermal power generation.

EXAMPLES

A form retention stability test was made on solid fuels obtained in Examples by the following method.

100 kg of the solid fuel was put into a metal can (drum can) having a capacity of 200 liters, the can was rolled 100 m on a flat asphalt road for 3 minutes, and this was repeated 5 times (a total of 1,000 m). Thereafter, the solid fuel was taken out from the metal can and the ratio (%) of the solid fuel passing through a sieve having an opening of 10 mm or less was taken as form retention stability.

Evaluation Criteria

The ratio (weight) of the solid fuel passing through a sieve having an opening of 10 mm or less was calculated and evaluated based on the following criteria.

0 to 5% or less: satisfactory
6 to 10% or less: acceptable
11 to 15%: unsatisfactory

| | |
|---|---|
| 0 to 5 % or less: | satisfactory |
| 6 to 10 % or less: | acceptable |
| 11 to 15%: | unsatisfactory |

Examples 1 to 7

A cylindrical solid fuel having an extrusion diameter of about 50 mm (length of 65 mm) was obtained from the press cake of each of fruit seeds shown in Table 1 below as a raw material composition (each composition contained 80 wt % of the press cake and 20 wt % of natural rubber) by means of a double-screw extruder heated at 130° C. The apparent specific gravity (bulk specific gravity), calorific value and form retention stability test result of each of the obtained solid fuels are shown in Table 1 below.

TABLE 1

| | | | | Bulk specific | Calorific value | | |
|---|---|---|---|---|---|---|---|
| | | Product | Size | gravity | Joule | Calorie | Form retention |
| | Type | Raw material | mm | g/cm | (MJ/kg) | (cal/g) | stability |
| Ex. 1 | Sample (1) | *Ricinus communis* | 50 | 0.47 | 26.86 | 6415.4 | satisfactory |
| Ex. 2 | Sample (2) | *Triadica sebifera* | 50 | 0.51 | 25.11 | 5997.4 | satisfactory |
| Ex. 3 | Sample (3) | *Jatropha curcas* | 50 | 0.48 | 26.43 | 6312.7 | satisfactory |
| Ex. 4 | Sample (4) | *Brassica rapa L.* var. *nippo-oleifera* | 50 | 0.52 | 22.10 | 5278.5 | satisfactory |
| Ex. 5 | Sample (5) | Plamae | 50 | 0.45 | 24.62 | 5880.4 | satisfactory |
| Ex. 6 | Sample (6) | *Zea mays* | 50 | 0.55 | 24.84 | 5932.9 | satisfactory |
| Ex. 7 | Sample (7) | Honey mesquito | 50 | 0.51 | 22.89 | 5467.2 | satisfactory |

What is claimed is:

1. A solid fuel which comprises a composition containing 70 wt % or more, on dry basis, of the fruit seed or press cake thereof of *Ricinus communis* which is hot compression molded.

2. The solid fuel according to claim 1, wherein the composition contains 80 wt % or more, on dry basis, of the fruit seed or press cake thereof.

3. The solid fuel according to claim 1, wherein the composition contains 85 wt % or more, on dry basis, of the fruit seed or press cake thereof.

4. The solid fuel according to claim 1 which is obtained by compression molding the composition at a temperature of 80 to 150° C.

5. The solid fuel according to claim 1 having a calorific value of 15 to 30 Mj/kg.

6. The solid fuel according to claim 1 having an average size of 15 to 3,500 cm$^3$.

7. The solid fuel according to claim 1 having an apparent specific gravity of 0.3 to 0.6 g/cm$^3$.

8. The solid fuel according to claim 1 having a fragmentation ratio of 5 wt % or less in a form retention stability test.

9. The solid fuel according to claim 1 which is used for power generation.

\* \* \* \* \*